UNITED STATES PATENT OFFICE.

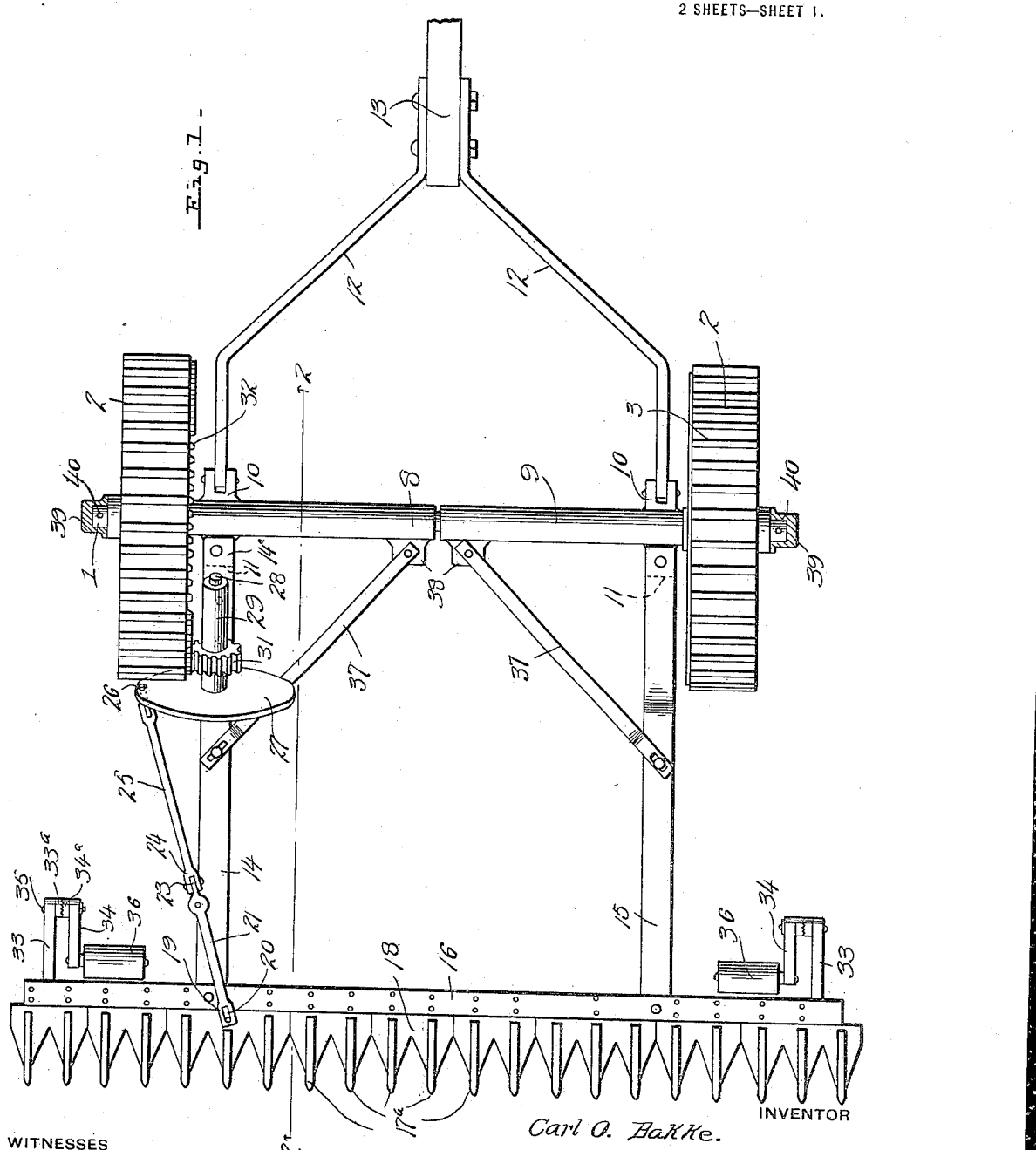

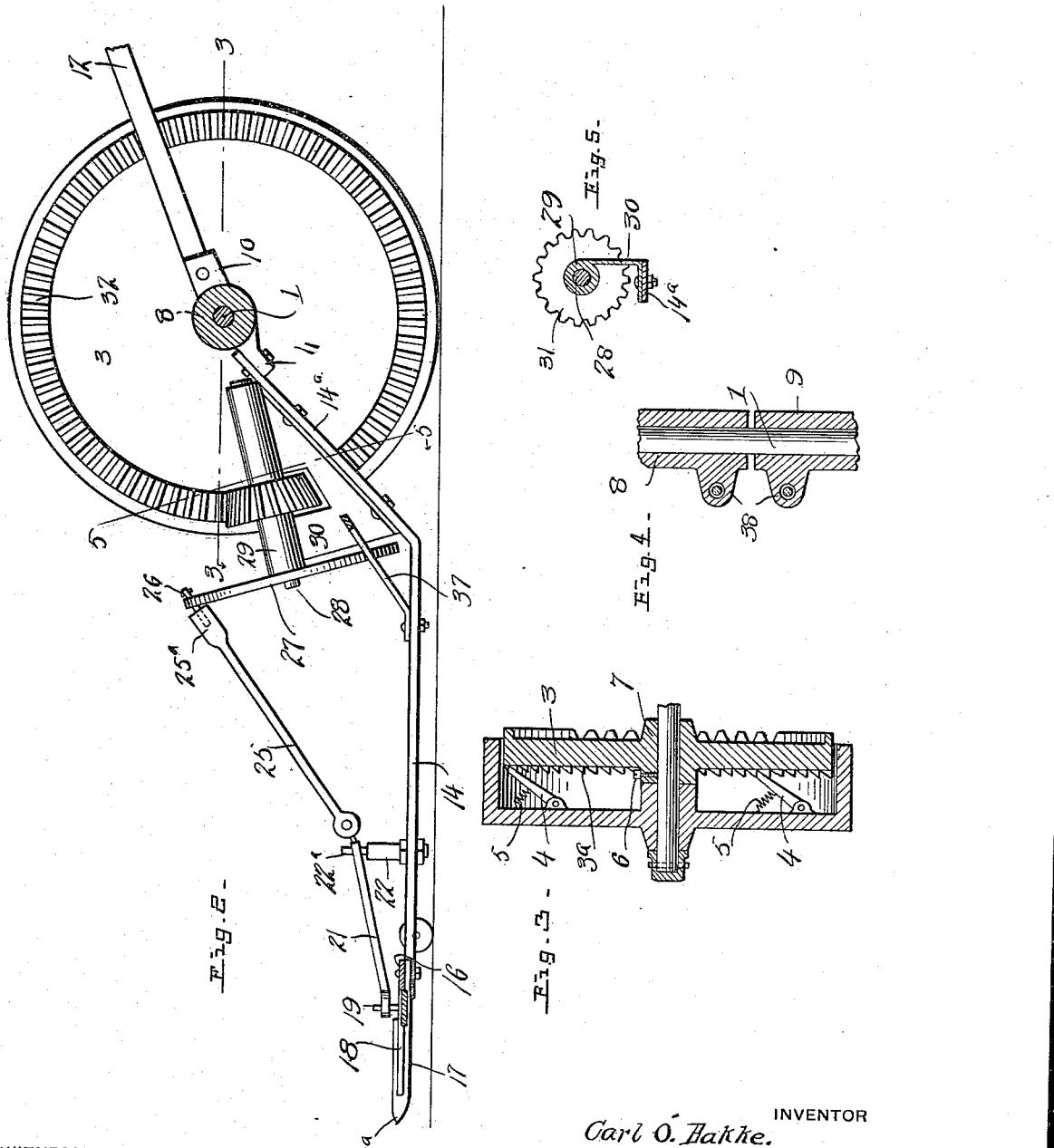

CARL O. BAKKE, OF FERTILE, MINNESOTA.

LAWN-MOWER.

1,220,489.

Specification of Letters Patent.

Patented Mar. 27, 1917.

Application filed July 25, 1916. Serial No. 111,311.

*To all whom it may concern:*

Be it known that I, CARL O. BAKKE, a citizen of the United States, residing at Fertile, in the county of Polk and State of Minnesota, have invented certain new and useful Improvements in Lawn-Mowers, of which the following is a specification.

This invention relates to lawn mowers and more particularly to a lawn mower in which the cutting is accomplished by means of a reciprocating mechanism operated from one of the wheels of the machine.

One of the main objects of the invention is to provide a mower of simple construction and operation which requires relatively small power to operate the cutting mechanism.

A further object is to provide a mower in which the cutting mechanism can be quickly and easily adjusted vertically.

A further object is to provide a mower which can be quickly and easily disassembled for shipping, and similar purposes, and can be as quickly reassembled.

A still further object is to provide a machine which, when disassembled, can be packed in a comparatively small space.

Further objects will appear from the detail description.

In the drawings:

Figure 1 is a top plan view of the invention.

Fig. 2 is a section on the line 2—2 of Fig. 1.

Fig. 3 is a section through one of the ground wheels taken substantially on the line 3—3 of Fig. 2.

Fig. 4 is a fragmentary sectional detail view, and

Fig. 5 is a section on the line 5—5 of Fig. 2.

The numeral 1 designates the main shaft at each end of which is loosely mounted a flanged ground wheel 2, the outer periphery of which is serrated so as to provide a gripping surface in the usual manner. Within the wheels 2 are mounted the driving disks 3. Each of these disks is provided on its inner face, with a ratchet ring 3ᵃ adapted to be engaged by the dogs 4 pivoted on the inner face of the web portion of the wheel. These dogs are held inward by expansion springs 5 mounted between the same and the wheel web. The dogs 4 and the teeth of the ratchet ring 3ᵃ are so relatively disposed that, when the mower is moving forward, the disks 3 will rotate with the wheels 2. Each disk is locked to the shaft 1 by a binding screw 6 threaded through the hub 7 of the disk and engaging the shaft in the usual manner.

Two elongated sleeves 8 and 9 are loosely mounted on the shaft 1 intermediate the disks 3. Each of these sleeves is provided, adjacent its outer end, with an integral U-bracket 10 and an integral lug 11 opposite thereto. The U-brackets 10 receive the inner ends of the arms 12, pivotally secured therein, of a fork, the outer end of which is fixedly secured to the lower end of a handle 13 which may be provided with the usual cross head (not shown).

This provides pivotal connecting means whereby the shaft 1 and elements mounted thereon may be easily moved in any desired direction.

A supporting yoke for the cutting mechanism is suspended from the sleeves 8 and 9. This yoke comprises the arms 14 and 15 secured to the lugs 11 at their inner ends, and the cross bar 16 secured to the forward or outer ends of the arms. Each of the arms has a horizontally extending portion and an upwardly and inwardly inclined inner portion, the upper end of which is secured to the lug 11, as clearly shown in Fig. 2 of the drawings.

A toothed cutter bar 17 is supported by the bar 16 and is provided with a plurality of integral guard teeth 17ᵃ. These teeth are centrally slotted to receive a toothed sickle bar 18 which is reciprocably mounted on the cutter bar and coöperates therewith in the usual manner. This sickle bar is provided with a post 19 which projects through an elongated aperture or slot 20 formed in the outer end of a lever 21. This lever is pivoted, adjacent its inner end, on the reduced upper portion 22ᵃ of a standard 22 fixedly secured to the supporting arm 14. The lever 21 is provided with an integral inwardly projecting tongue 23 which fits snugly in a U-head 24 provided at the outer end of a pitman 25 and pivotally secured thereto on a horizontal axis. The inner end of this pitman is provided with an axial recess or bore which receives a pin 26 fixedly secured to a disk 27. This pin is eccentrically mounted through the disk which is keyed on the outer end of a shaft 28 rotatably mounted in a bearing sleeve 29 formed integral with a bracket 30 which is fixedly secured to the outwardly inclined portion 14ᵃ of the arm 14. The sleeve 29 and bracket 30 are provided with alined apertures to receive the beveled gear 31 keyed on the shaft 28 in rear of disk 27. This gear meshes with a gear ring 32 formed integral with, and on the outer face of, one of the drive-disks 3, and also acts to prevent longitudinal movement of the shaft 28.

When the mower is pushed forward the disk 27 will be rotated at relatively high speed through the gear ring 32. This will cause rotation of the inner end of head 25ᵃ of the pitman 25, which will cause reciprocation of the lever 21. The lever rod 21 acts to reciprocate the sickle bar in the usual manner. Due to the greater length of the pitman 25, relatively to the lever 21, but a comparatively small amount of power is required to operate the cutting mechanism.

At each end of the bar 16 is secured an arm 33. This arm is provided, on its inner end, with an integral laterally disposed collar 33ᵃ, the outer end of which is provided with a plurality of teeth or serrations. This collar is adapted to coöperate with a similar collar 34ᵃ formed integral with the inner end of an arm 34 pivotally secured to the arm 33 by means of a bolt 35 passed through the ends of both of said arms. The arm 34 carries at its forward end, a small roller 36 rotatably secured thereto by a pivot bolt, or other suitable means. It will be evident that, by loosening the bolt 35, the arms 33 and 34 can have their angular adjustment varied. By this means bar 16, and consequently the cutting mechanism carried thereby, can be quickly and easily adjusted to suit the particular grass being cut. In making this adjustment, the arms 14 and 15 which carry the cutting mechanism will rock on the shaft 1 so as to accommodate the vertical movement of the cross bar.

To insure rigidity of the arms 14 and 15, diagonal braces 37 have their lower ends secured thereto and their upper ends secured to lugs 38 formed integral with the sleeves 8 and 9 at the inner ends thereof.

A cap 39 is secured on each end of the shaft 1, by means of a pin 40. These caps serve to secure the wheels 2 in position on the shaft without interfering with the freedom of rotation of the same.

By mounting the means for operating the cutting mechanism on the arm 14, the bar 16 may be adjusted as desired without in any way interfering with the operation of the machine.

As clearly shown in Fig. 2 of the drawings, the arms 14, bar 16, brace 37, and lugs 11 of sleeves 8 and 9, are all detachably secured together by bolt and nut means. This renders it possible to quickly and easily detach the yoke supporting the cutting mechanism from the sleeves 8 and 9 so as to disassemble the machine, for shipping and other purposes. By loosening the nuts threaded on the bolts for securing the outer ends of arms 14 and 15 to the cutter bar 16, and disconnecting lever 21 from post 19, the arms, together with the sickle bar operating mechanism carried by arm 14, may be folded into approximate parallelism with bar 16, the arms 34 being also secured in raised position so as to bring reelers 36 into position closely adjacent to, and parallel with the cutter bar. When folded in this manner the yoke and cutting mechanism constitute a unit of the machine which may be packed in a comparatively small space, the axle and ground wheels forming a second unit which may be shipped in a separate package. To reassemble the machine it is only necessary to secure the arms 14 and 15 to the lugs 11 and tighten the connections between these arms and the bar 16. In case where the machine is to be shipped over a long distance, and it is desired to pack it very tightly, it may be entirely disassembled, the sleeves 8 and 9 being removed from the axle, and the arms 14 and 15 being disconnected from bar 16. When entirely disassembled in this manner the machine may be packed tightly so as to occupy but very little space, and may be quickly and easily reassembled.

It will be evident that certain changes may be made in the construction and arrangement of the various parts of my invention without departing from the field and scope of the same and I intend to include all such variations in this application as fall within the scope of the appended claims in which a preferred form only of my invention is disclosed.

What I claim is:

1. In a mower, an axle, a ground wheel mounted at each end thereof, a pair of sleeves rockably mounted on said axle, forwardly extending arms detachably secured at their inner ends to each of said sleeves, a cutter bar secured on the outer ends of said arms, the outer end of the arms being secured to said cutter bar by bolt and nut means whereby said arms may be folded into approximate parallelism with the cutter bar when detached from said sleeves, a sickle bar reciprocably mounted on said cutter bar, and means carried by one of said arms connected to one of the ground wheels for reciprocating said sickle bar.

2. In a mower, the combination of an axle, a ground wheel mounted at each end of the axle, sleeves rockably mounted on the axle and each provided with an integral forwardly extending lug, forwardly extending parallel arms detachably secured at their inner ends to said lugs, a bar carried by said arms at their outer ends and detachably secured thereto, means carried by the bar for adjusting the same vertically, said means being adjustable about a horizontal axis whereby the adjusting means is adapted to be moved into a position closely adjacent to, and parallel with, said bar, a cutter bar carried by the bar carried by said arms, a sickle bar reciprocably mounted on the cutter bar, a lever pivoted on one of said arms and loosely connected at its forward end to the sickle bar, a shaft rotatably supported on one of said arms, a disk secured on said shaft, a pitman pivotally connected at its forward end to the inner end of the lever, the inner end of the pitman being loosely and eccentrically connected to the disk, a gear ring pivotally connected to one of the ground wheels so as to rotate therewith when the ground wheel is rotated in one direction, and a bevel gear keyed on the shaft and meshing with said gear ring.

In testimony whereof I affix my signature in presence of two witnesses.

CARL O. BAKKE.

Witnesses:
A. P. HANSON,
MELVIN S. HOLTEN.

Copies of this patent may be obtained for five cents each, by addressing the "Commissioner of Patents, Washington, D. C."